April 29, 1947.  W. R. WIBERG  2,419,750
FLEXIBLE DUCT COUPLING
Filed Nov. 22, 1944

INVENTOR.
WALTER R. WIBERG
BY Reynolds + Beach
ATTORNEYS

UNITED STATES PATENT OFFICE 2,419,750

FLEXIBLE DUCT COUPLING

Walter R. Wiberg, Seattle, Wash., assignor to Boeing Aircraft Company, Seattle, Wash., a corporation of Washington Application November 22, 1944, Serial No. 564,615

6 Claims. (Cl. 285—90)

It is sometimes desired to isolate one conduit from a second conduit which is movable through a small amplitude and connected to the first conduit. Resilient mountings have been employed to support an internal combustion engine, such as an airplane engine, so that it can rock, or move slightly in other ways, relative to its supporting structure, to reduce the vibration of a vehicle in which it is installed. In such cases the rigid connection of a conduit to the engine and to its supporting structure would largely defeat the purpose for which such resilient mountings are used, since considerable movement would be transmitted from the engine to its support through such conduit. Nevertheless conduits are frequently necessary to convey air to a carburetor mounted directly on the engine, or perhaps to supply a combustible mixture of air and fuel to the engine.

In installations of the type mentioned, for example, it has been customary to insert a flexible hose section in the conduit. While such hose sections are capable of bending to a considerable degree they cannot absorb relative movement of the conduit sections between which they are connected in a direction axially of such sections. Moreover they are subjected to excessive hoop tension stresses.

It is a principal object of my coupling to connect together conduit or duct sections of metal or equivalent material in a manner which will effectively isolate one section from another section which may be movable axially and tiltable to some extent. Thus the movable conduit section may, for example, be mounted directly upon an engine carried by resilient mountings, while the other conduit part may be secured to a stationary engine support. In such a connection the flexible material is subjected to small stress as compared to that imposed on such material in couplings of the type previously used.

A further object is to provide a coupling with such capabilities in which the flexible elements of the joint, made of material such as synthetic rubber, may be secured positively in place without the aid of adhesives, if desired.

An additional object is to provide such a coupling which is of simple construction, which can be utilized with conduits of different cross-sectional shapes and which can be installed easily.

The flexible structure may take forms different from that shown in the accompanying drawing, which is the construction preferred for reasons which will be pointed out hereafter.

Figure 1:
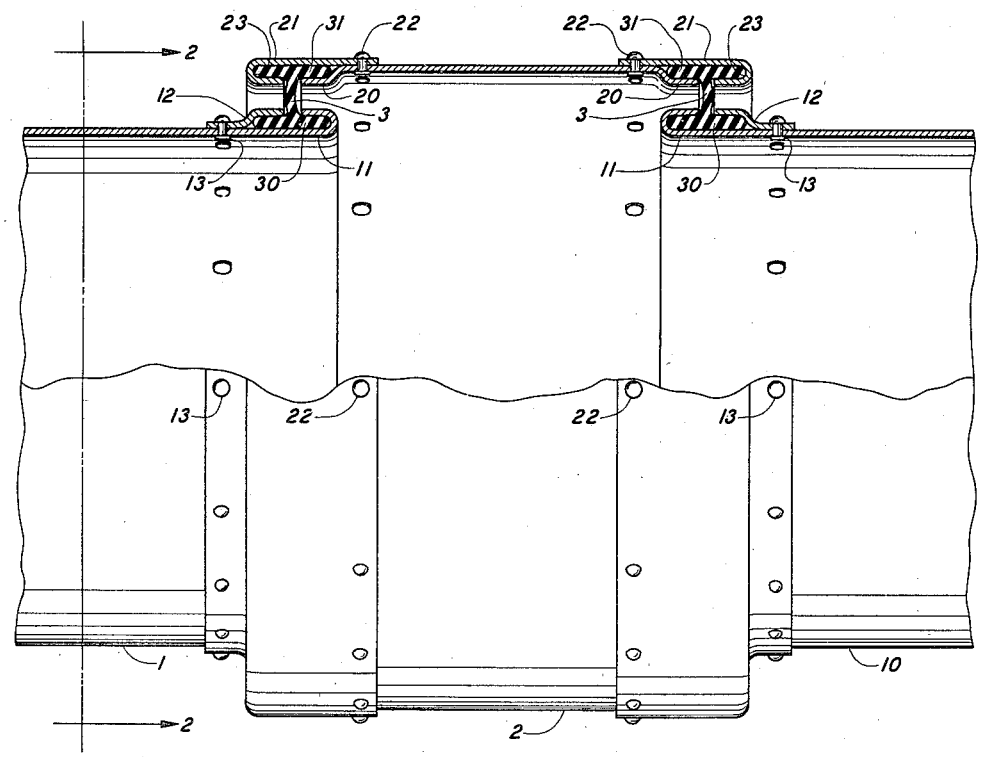
Figure 1 is a side elevation view of a coupling incorporating my invention, parts being broken away to show more clearly internal features of its structure.
Figure 2:
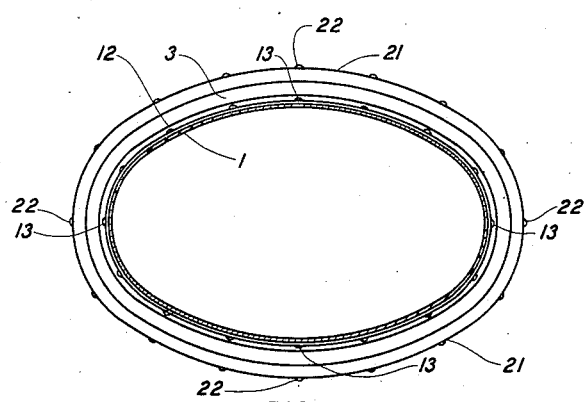
Figure 2 is a sectional view taken transversely of the conduit on line 2—2 of Figure 1.

In Figure 1 of the drawing conduit sections 1 and 10 are the two parts to be joined. It is preferred in most instances that such sections be of the same size and shape in cross section. While both of these ducts may be cylindrical, frequently they are of elliptical cross section as shown in Figure 2, and may be rectangular with rounded corners. The same general type of construction may be employed for the coupling whatever the cross-sectional shape of the ducts to be joined may be. In fact the two ducts may be of different shape, my joint effecting the transition between them.

Because the adjacent ends of the conduit sections 1 and 10 are of the same size and shape, an outer conduit section or sleeve 2, disposed with its opposite ends over-lapping both of the adjacent ends of the inner conduits, is utilized for making the connection between them. This sleeve is of the same cross-sectional shape as the ducts themselves, though larger. Each end of sleeve 2 is connected to the duct section end which it overlies by a connecting ring of flexible material, preferably molded of synthetic rubber, though for some installations it may be made of rubber, leather or other flexible material. This ring includes a substantially planar, annular web portion 3 extending transversely of conduit sections 1 and 10 and sleeve 2, being disposed substantially in a plane perpendicular to the axes of such members. In order to afford freedom of movement of the conduit sections 1 and 10 generally axially relative to each other, the flexible rings are made of material sufficiently soft to be stretched radially of the ducts somewhat. Nevertheless such rings can withstand considerable duct pressure, as much as 25 pounds per square inch or more, because the pressure acts only axially against the ring webs, which function as annular diaphragms. Under pressure the webs of the connecting rings will therefore be bowed outward slightly, as shown in the upper portion of Figure 1.

Various constructions of the duct sections and of the sleeve ends may be utilized to retain the connecting rings in place, such rings being of appropriate shape to cooperate with such duct and sleeve ends. Since the material of the connecting rings, being highly flexible, is quite soft, however, it is preferred that these rings be molded in H-shape cross section. It is not essential that these elements be molded in ring form, but a straight strip may be molded of such cross section, and then a piece of appropriate length may be looped and its ends cemented together to form a ring of the desired size.

Each ring, therefore, will include a flange 30 integral with its inner periphery and projecting in opposite directions from the web axially of the ducts. Similarly an outer flange 31 integral with the outer periphery of the web 3 of each ring projects in opposite directions from the web axially of sleeve 2. By providing a duct and sleeve end structure embracing closly these inner and outer flange portions of each connecting ring the rings will be held positively in place.

A convenient retaining structure for such a connecting ring is formed by bending the end of each inner conduit section 1 and 10 outward and then backward over the respective conduit to form an annular groove 11 of a width and depth such that the portion of a ring's inner flange 30 projecting beyond one side of web 3 will fit snugly in it. If the material of which conduits 1 and 10 are made is sufficiently malleable, such as aluminum, it may be possible to spin over the end of the duct, accompanied by stretching of the conduit material.

If the metal of the duct is not sufficiently malleable to enable this operation to be performed without splitting the end, however, cuts may be made in the end of each conduit section at intervals around its periphery, and the tabs formed intermediate such cuts may be bent reversely in the manner shown to form the groove 11 for receiving one portion of the inner flange 30 of each connecting ring. Alternatively the outer element may be formed separately as a ring and joined to the conduit end at the bottom of groove 11 by welding or equivalent process.

To embrace and retain the portion of each connecting ring flange 30 on the opposite side of its web, remote from the end of the conduit which the ring engages, a strip 12, offset radially to contact the outer surface of such connecting ring flange portion, may encircle and embrace closely the exterior of each conduit section 1 and 10. These strips may be held in place by securing members 13 extending through them and the duct wall, which may be rivets, as shown, or bolts, sheet metal screws, or other type of interconnecting elements. Despite the highly flexible character of the connecting ring, therefore, it will be evident that flange 30 cannot escape from the end of its respective duct under the application of a force in either direction axially of the duct or outwardly radially of the duct, whether created by relative movement of the duct sections or by fluid pressure within the duct acting against the ring's web, or under a combination of such forces.

The end of sleeve 2 in each instance may be offset inward to form a ledge 20 fitting within the adjacent portion of the outer ring flange 31, the exterior of the flange being flush with the outer periphery of sleeve 2. The portion of the flange 31 of each connecting ring at the side of its web remote from sleeve 2 may be embraced by a metal strip 21 secured by rivets 22, or equivalent securing members, to the sleeve in contiguous engagement with it. The free edge of this strip is bent inward to form a groove 23 in which such portion of each connecting ring flange 31 fits snugly.

The strips 21 may be of material, such as aluminum, soft enough to be bent reversely to form the groove 23 embracing the flange 31, but if not, the edges of each of these strips may be notched at intervals before being bent inwardly, to form such groove by tabs engaged under the connecting ring flange 31. This flange is thus held in such manner that it cannot be displaced from sleeve 2 by stresses acting on web 3 in either direction axially of the sleeve or radially inward of the sleeve.

While it is preferred that the connections between both ends of sleeve 2 and duct sections 1 and 10, respectively, be resilient, sufficient flexibility may be imparted to the joint in many cases by making only one of such connections yieldable. Likewise, in connecting a large duct to a smaller one of similar cross-sectional shape, only one resilient connecting ring would be employed. The particular proportions of the web 3 and flanges 30 and 31 of the flexible connecting rings are not critical, but the ring web should be of sufficient width to allow reasonable axial or tilting movement between ducts. The flanges of the connecting rings should project far enough beyond the opposite sides of their webs to afford a good grip on them at each side of the web by the structure described.

Such structure was designed to avoid sheet edges being located within either of the conduit sections 1 and 10, or sleeve 2. As an alternative construction, however, the body of either or both of conduit sections 1 and 10 could be offset outward in the shape of strips 12, corresponding to the inward offset 20 of sleeve 2. The groove 11 in each instance could then be formed by a separate strip, corresponding to strip 21 secured to sleeve 2. In that case the edge of each such strip would be located inside its corresponding duct section, which is less desirable than the arrangement illustrated in the drawings and described above.

Similarly, prior to installation of sleeve 2 over the adjacent ends of duct sections 1 and 10, the flanges 31 of the connecting rings could be received in grooves 23 formed by the edges of sleeve 2 turned inward. The offset portions 20 of the sleeve end could be replaced by a strip corresponding to the strips 12 encircling conduit sections 1 and 10.

These possible constructions are suggested merely to illustrate that a number of variations could be made in the ring retaining structure shown in the drawing while attaining the same general results more or less satisfactorily, although the assembly of the couplings is facilitated by the preferred construction.

In installing the coupling a connecting ring may be placed over one of duct sections 1 and 10 and connected to it by application of strip 12, and to sleeve 2 by securing the appropriate strip 21 in place, before sections 1 and 10 are secured in their desired relationship. Flange 31 of the other connecting ring may then be secured to sleeve 2. Conduit sections 1 and 10 may now be arranged in the desired relationship, the section not attached to sleeve 2 being inserted through the unsecured inner flange 30 of the connecting ring carried by sleeve 2. Such ring flange is then inserted in its groove 11, and strip 12 is applied to anchor such flange.

In some instances where the relative movement of sleeves 1 and 10 is not great or violent, and the fluid pressure within the duct is slight, one or both of flanges 30 and 31 of the connecting ring may project beyond only one side of the web 3. The ring might thus be molded of channel or Z cross section, or otherwise formed to afford marginal inner and outer portions to be secured. If the flanges of such a strip are merely to be confined, however, a more positive grip is insured when they project axially to some extent at least beyond both sides of web 3, although the projecting portions of the flanges at opposite sides of the web need not be of equal width. Alternatively the flanges of the connecting rings can be bonded to the duct sections, even if the rings are of channel or Z cross section. In fact the ring flanges may be omitted and the web itself may be bonded to the tube parts, particularly if a flange is turned outward on the inner tubular member and a flange is turned inward on the outer tubular member.

When the ends of the ducts 1 and 10 to be joined are not of the same size and shape, the sleeve 2 constitutes a transition piece. Each end of such sleeve in such instance should correspond substantially in shape to the duct end which it encircles, but should be somewhat larger than such duct end.

I claim as my invention:

1. In a conduit joint, an outer conduit section, an inner conduit section disposed substantially concentrically within said outer section, a connecting ring including an annular web of resilient material, an inner edge portion integral with the inner periphery of said web and projecting therefrom axially of said inner conduit section and being disposed adjacent thereto, and an outer edge portion integral with the external periphery of said web and projecting therefrom substantially axially of said outer conduit section and being disposed adjacent thereto, and each conduit section having a sheet metal portion folded back upon itself to form a trough closely embracing the corresponding adjacent edge portion of said connecting ring.

2. In a conduit joint, an outer conduit section and an inner conduit section arranged substantially concentrically, having adjacent overlapping ends of similar shape, and a connecting ring of resilient material substantially H-shape in cross section forming an annular web disposed substantially perpendicular to the axis of said outer conduit section, an inner flange integral with the inner periphery of said web and projecting in opposite directions therefrom substantially axially of said inner conduit section, said inner flange substantially corresponding to said inner conduit section in shape and being disposed adjacent to the end thereof, and an outer flange integral with the exterior periphery of said web and projecting in opposite directions therefrom substantially axially of said outer conduit section, said outer flange substantially corresponding to said outer section in shape and being disposed adjacent to the end thereof, means securing said outer flange of said connecting ring to the adjacent end of said outer conduit section, and means securing said inner flange of said connecting ring to the adjacent end of said inner conduit section.

3. In a conduit joint, an outer conduit section and an inner conduit section arranged substantially concentrically, having adjacent overlapping ends of similar shape, and a connecting ring of resilient material substantially H-shape in cross section forming an annular web disposed substantially perpendicular to the axis of said outer conduit section, an inner flange integral with the inner periphery of said web and projecting in opposite directions therefrom substantially axially of said inner conduit section, said inner flange substantially corresponding to said inner conduit section in shape and being disposed adjacent to the end thereof, and an outer flange integral with the exterior periphery of said web and projecting in opposite directions therefrom substantially axially of said outer conduit section, said outer flange substantially corresponding to said outer section in shape and being disposed adjacent to the end thereof, means securing said outer flange of said connecting ring to the adjacent end of said outer conduit section, and means securing said inner flange of said connecting ring to the adjacent end of said inner conduit section, the overlapping end of said outer conduit section being constructed to embrace and substantially enclose the portions of said outer connecting ring flange at both sides of the connecting ring web, and the end of said inner conduit section being formed to embrace and substantially enclose the portions of said inner connecting ring flange at both sides of said connecting ring web.

4. A conduit joint, comprising two conduit sections of substantially the same cross sectional size and shape and having adjacent ends of such sections spaced apart a substantial distance, an intermediate conduit section larger than said first two conduit sections in cross section but similar thereto, and of a length to overlap both the adjacent ends of said first conduit sections, and two connecting rings of resilient material substantially H-shape in cross section, forming in each an annular web disposed substantially perpendicular to the axis of said intermediate conduit section, an inner flange integral with the inner periphery of said web and projecting in opposite directions therefrom substantially axially of its respective first conduit section, said inner flange substantially corresponding to the corresponding one of said first conduit sections in shape and being disposed adjacent to the end thereof, and an outer flange integral with the exterior periphery of said web and projecting in opposite directions therefrom substantially axially of said intermediate conduit section, said outer flange substantially corresponding to said intermediate conduit section in shape and being disposed adjacent to the corresponding end thereof, means securing the outer flange of each of such connecting rings to the respectively adjacent end of said intermediate conduit section, and means securing the inner flange of each of such connecting rings to the adjacent end of the respective first conduit sections.

5. In a conduit joint, a sheet metal conduit section, a member adapted to be connected to said conduit section, a connecting ring including a web of resilient material having flanges projecting oppositely from one edge of said web, said conduit section having two sheet metal flange portions overlapping said ring flanges and cooperating with said conduit section to inclose said flanges, and means securing the edge of said connecting ring web remote from said flanges to said member.

6. In a conduit joint, a sheet metal conduit section, a member adapted to be connected to said conduit section, a connecting ring including a web of resilient material having flanges projecting oppositely from one edge of said web, the end of said sheet metal conduit section being folded back upon itself to form a sheet metal trough closely embracing one flange of said connecting ring, and means securing the other flange of said connecting ring to said conduit section.

WALTER R. WIBERG.

REFERENCES CITED

The following references are of record in the file of this patent:

UNITED STATES PATENTS

| Number | Name | Date |
|---|---|---|
| 315,387 | Hobart | Apr. 7, 1885 |
| 1,923,124 | Stanley | Aug. 22, 1933 |
| 2,192,395 | La Bour | Mar. 5, 1940 |
| 1,473,173 | Brinkerhoff | Nov. 6, 1923 |
| 1,791,717 | De Vito | Feb. 10, 1931 |
| 1,853,156 | Sobon | Apr. 12, 1932 |
| 1,871,883 | Geyer | Aug. 16, 1932 |
| 1,884,374 | Tatter | Oct. 25, 1932 |
| 1,983,106 | Sundstrom | Dec. 4, 1934 |
| 2,242,582 | Jencick | May 20, 1941 |

FOREIGN PATENTS

| Number | Country | Date |
|---|---|---|
| 10,199 | British | Apr. 30, 1912 |
| 55,604 | Switzerland | Sept. 22, 1910 |